(12) United States Patent
Poechmueller et al.

(10) Patent No.: US 7,801,853 B2
(45) Date of Patent: Sep. 21, 2010

(54) STARTING UP AN APPLICATION IN A MOBILE CLIENT

(75) Inventors: Werner Poechmueller, Hildesheim (DE); Gerrit De Boer, Hildesheim (DE); Michael Laedke, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 10/584,782

(22) PCT Filed: Dec. 22, 2004

(86) PCT No.: PCT/EP2004/053652

§ 371 (c)(1),
(2), (4) Date: Aug. 14, 2008

(87) PCT Pub. No.: WO2005/064274

PCT Pub. Date: Jul. 14, 2005

(65) Prior Publication Data

US 2008/0306960 A1 Dec. 11, 2008

(30) Foreign Application Priority Data

Dec. 27, 2003 (DE) ................................ 103 61 628

(51) Int. Cl.
*G06F 17/30* (2006.01)
*G01C 21/26* (2006.01)
(52) U.S. Cl. .................. 707/617; 701/200; 342/357.12
(58) Field of Classification Search .................. 701/200; 342/357.12; 707/617
See application file for complete search history.

(56) References Cited

U.S. PATENT DOCUMENTS

| 4,340,935 A | * | 7/1982 | Anlauf et al. .................. 701/70 |
| 6,574,556 B2 | * | 6/2003 | Fish et al. .................... 701/213 |
| 6,628,233 B2 | * | 9/2003 | Knockeart et al. ........ 342/357.1 |
| 7,558,584 B2 | * | 7/2009 | Yamamoto et al. ....... 455/456.5 |
| 2003/0055553 A1 | | 3/2003 | Knockeart et al. |
| 2003/0110011 A1 | * | 6/2003 | Kyotoku ..................... 702/186 |

FOREIGN PATENT DOCUMENTS

| EP | 1 189 409 | 3/2002 |
| WO | 00/77620 | 12/2000 |
| WO | 02/37314 | 5/2002 |

* cited by examiner

*Primary Examiner*—James Trujillo
*Assistant Examiner*—Jorge A Casanova
(74) *Attorney, Agent, or Firm*—Kenyon & Kenyon LLP

(57) ABSTRACT

A method for starting up an application in a mobile data processing device, for the operation of which an information database is required in the device. The inventive method includes the following steps:
a) provision of a permanent portion and a temporary portion of the information database;
b) wire-bound transmission of the permanent portion from a central server to an intermediate server;
c) transmission of the permanent portion from the intermediate server to the device via a first transmission path and storage in the device;
d) transmission of the temporary portion via wireless communication, the wireless communication representing a second transmission path that is distinct from the first transmission path; and
e) execution of the application.

19 Claims, 3 Drawing Sheets

STARTING UP AN APPLICATION IN A MOBILE CLIENT

FIELD OF THE INVENTION

The present invention relates to a method for starting up an application in a mobile data processing device, referred to as a "client," an information database being required in the client to operate the application, it being possible for the information database to be composed of program instructions and data which is accessed by these instructions.

BACKGROUND INFORMATION

Transmitting the necessary information database to the client is complex and difficult at times, particularly when the client is a device that is permanently installed in a mobile platform such as a motor vehicle and cannot be easily separated from the mobile platform, e.g., like a laptop, and that may be connected to a stationary data network to receive the required information. Depending on the variability of the information database, various techniques have been used to provide the required information database for vehicle-supported clients. In the case of an engine control unit, for example, the variability of the information database is minimal. As a result, it usually suffices to permanently install the information database in the electronic control unit in the form of a non-volatile memory component. Updating the information database is not ruled out entirely, but it is difficult to do.

Other data processing devices in motor vehicles, such as vehicle navigation systems in particular, require a substantially more extensive information database that must also be updated from time to time to ensure the effectiveness of the navigation system. In this case, it is common practice to record the required information database or at least modifiable portions thereof on portable data carriers, in particular CD-ROMs, which can be utilized in a reading device of the navigation system. A method of this type is practicable when the frequency with which the data carriers must be updated is not too great. Navigation information that is updated daily or even hourly—which is required to avoid temporary obstacles such as construction sites and traffic jams—cannot be easily provided in this manner.

It is possible, in principle, to make information available quickly via wireless communication, in particular by a point-to-point dial-up connection in a mobile network, but this method is limited by the high connection costs and limited transmission bandwidths that result in significant transmission delays when large quantities of data are involved. Wireless transmission is therefore an option only for applications with very limited data requirements.

SUMMARY OF THE INVENTION

The object of the present invention is to create a method for starting up an application in a mobile data processing device that enables timely, cost-effective updating even when an extensive information database is required to operate the application.

The object is achieved by a method composed of the following steps:
a) provision of a permanent portion and a temporary portion of the information database;
b) wire-bound transmission of the permanent portion from a main server to an intermediate server,
c) transmission of the permanent portion from the intermediate server to the device via a first transmission path and storage in the device,
d) transmission of the temporary portion via wireless communication, the wireless communication representing a second transmission path that is distinct from the first transmission path, and
e) execution of the application.

By dividing the information database into a permanent portion and a temporary portion, a cost-effective transmission path may be selected for the permanent portion, which makes transmission of large quantities of data affordable. Since this transmission path is rarely used, it can be designed to be slightly less user-friendly than the wireless communication. In addition, the costs for wireless transmission are reduced considerably, since they are only incurred for a smaller portion of data. Due to the fact that the permanent portion of the information database is transmitted to an intermediate server, the users of the data processing devices are provided with the capability of obtaining this information themselves, if necessary, from an intermediate server of this type; as a result, the application provider does not need to prepare and distribute a large number of data carriers for the permanent information. If transmission of step c) takes place over a data line, a data carrier of this type is not needed at all. Otherwise, it is possible to create a data carrier of this type on the intermediate server, as necessary.

Preferably, there are a large number of intermediate servers that are connectable or connected to the main server, and from which a user may send a request to the central server that prompts the central server to send the permanent portion of the information to the requesting intermediate server.

In particular, when the permanent portion is a new version of an existing application or a new application that may be interesting to the users of the existing application, and these users are registered with the provider, these users may be notified, e.g., via e-mail, by the central server about the availability of the new version or application, to prompt them to request it.

Transmission from the main server to the intermediate server in step b) preferably takes place via a dial-up connection. This makes it possible to supply intermediate servers located far apart, and possibly around the world, without requiring a large outlay for a communication infrastructure.

Before the permanent portion of the information database is transmitted to an intermediate server of this type, it may be advantageous to first transmit data from the device, provided as the receiver of the information, to the main server, the data containing information about the identity of the mobile device or its location. Data regarding the location makes it possible for the main server to transmit the permanent portion of the information in a targeted manner to the intermediate server which is most easily reached by the mobile device, e.g., in a repair shop located close to the current location of a motor vehicle in which the mobile device is installed. Based on data about the identity of the requesting device, the central server may detect technical properties of the device associated with this data before transmitting the permanent portion to the intermediate server and, with consideration for these properties, it may select, from a plurality of versions of permanent information, the version that is compatible with the requesting device and/or it may deny the transmission if the device is recognized as being unsuited for processing this permanent information.

Transmission of data about the identity of the mobile device may also advantageously take place before step d) to allow the main server to check whether the mobile device is even suited to receiving the temporary information.

The transmission of this data to the main server preferably takes place under the control of program instructions that belong to the permanent portion of the information database.

A particularly high degree of flexibility is attained when the temporary portion of the information database to be transmitted is generated by the central server based on data transmitted previously from the device via wireless communication, e.g., it is calculated, created by combining other data, etc. For example, when the device is a navigation system, it becomes possible to transmit temporary information selectively for a region in which the system is currently located, thereby limiting the quantity of data to be transmitted via wireless communication to the minimum amount actually required. When the device is an engine control unit, other possibilities include transmitting control information tailored exactly to a temporary situation, e.g., to adjust the operation of the engine to fuel properties that change due to location and/or season, to run a self-test if a malfunction occurs, and to select further test program parts from a database based on test results reported by the device to the intermediate server and transmit them to the device, etc. In this manner it is possible to diagnose malfunctions in a motor vehicle to a considerable extent without having to bring the vehicle into the repair shop. Under favorable conditions, a defective component may be identified in this manner without accessing the motor vehicle directly, and the amount of time the vehicle must be left for repair is reduced to the amount of time required to replace the component.

DETAILED DESCRIPTION

Figure 1:
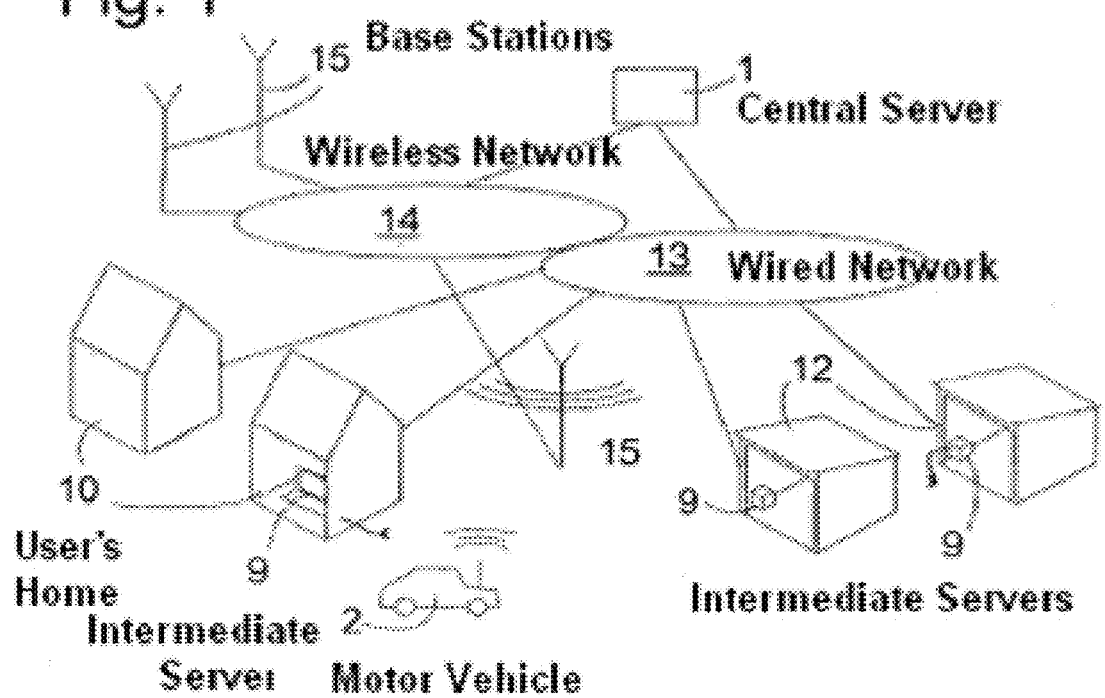
FIG. 1 shows a block diagram of a data transmission system for carrying out the method according to the present invention.

FIG. 1 is a block diagram of a data transmission system in which the present invention may be used. The data transmission system includes a central server 1 in which information required by mobile data processing devices to carry out a certain application is stored. An on-board computer system of a motor vehicle 2 is considered here as an example of a mobile data processing device of this type.

Central server 1 is connected via a wire-bound communications network 13 to a large number of intermediate servers 9, which may be, e.g., PCs installed in a user's home 10 or workplace. The intermediate servers typically include an interface for a data line for connecting the mobile device of vehicle 2 or a writing device for portable data carriers, such as a diskette drive or a CD burner. Other possible data carriers include a portable solid state memory such as a "memory stick" or a mobile miniature computer (palmtop, personal digital assistant (PDA)).

In addition, central server 1 is connected to a cellular mobile wireless communications system 14 such as a GSM or UMTS network that includes a large number of geographically distributed base stations 15.

Figure 2:
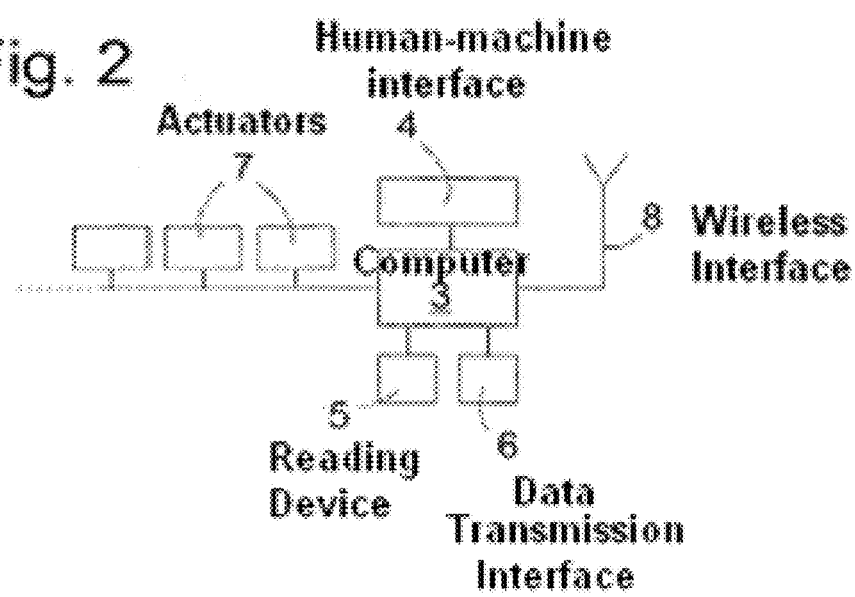
FIG. 2 shows a block diagram of a vehicle-supported data processing device.

A block diagram of the mobile device is shown in FIG. 2. It includes an on-board computer 3 of motor vehicle 2, having a processor and working memory, a human-machine interface 4, a reading device 5 for a portable data carrier such as a diskette, a CD-ROM or the like, and/or a data transmission interface 6 that makes it possible to transmit information to on-board computer 3 via an electrical or optical line. A large number of sensors and/or actuators 7 for detecting and/or influencing the operating parameters of motor vehicle 2 are connected to on-board computer 3 via a bus. A wireless interface 8, in particular for communication with network 14, is also connected. Human-machine interface 4 includes input and output means, the output means enabling the display of operating parameters of the motor vehicle, at least many of which may be selected using the input means.

A vehicle navigation system will be considered here as a first example of an application.

Information stored in central server 1 is subdivided into a permanent portion and a temporary portion. The permanent portion essentially includes program instructions that must be carried out by on-board computer 3 of motor vehicle 2 to implement the navigation system, and geographical information of long-term relevance to the user of motor vehicle 2. This information of long-term relevance includes, in particular, information about traffic flow in an area where motor vehicle 2 is regularly located. The temporary information is information of short-term relevance, in particular information about traffic jams, construction sites, and other obstacles on the routes defined in the permanent information.

Figure 3:
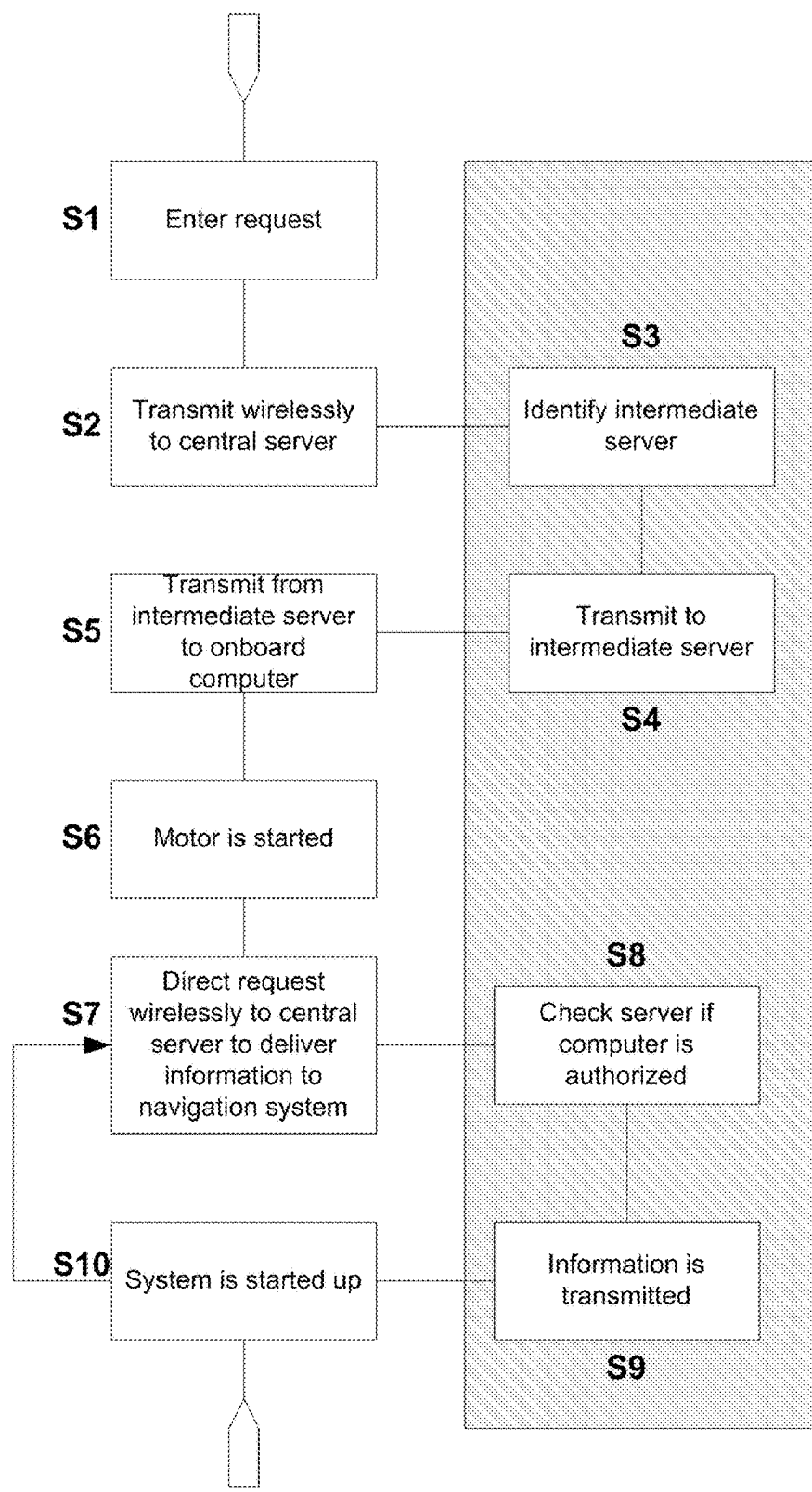
FIGS. 3-4 show flow charts of exemplary embodiments of the method according to the present invention.

The method depicted schematically in FIG. 3 is carried out to actually use the on-board computer as a vehicle navigation system. First, a user of motor vehicle 2 requests the transmission of the permanent portion of the information required therefor from central server 1 to an intermediate server 9.

This request may be transmitted in various ways. One advantageous possibility is, in step S1, to enter the request in human-machine interface 4, which, for this purpose, may display, e.g., a selection menu displaying available additional functionalities of on-board computer 3 which are implementable by transmitting the corresponding software to on-board computer 3. This request is transmitted in step S2 via wireless interface 8 and cellular wireless communications network 14 to central server 1. By referring to information sent from on-board computer 3 regarding the location of motor vehicle 2, e.g., an address entered by the user in human-machine interface 4 when the request was made, central server 1 is able to identify (S3) an intermediate server located in the vicinity of motor vehicle 2 and transmit (S4) the permanent portion of required information to it. This intermediate server may be, in particular, computer 9 in a repair shop 12 in the vicinity of motor vehicle 2; this is advantageous, in particular, when, in addition to simply transmitting information to on-board computer 3, work must also be performed on the vehicle to start up the navigation system. The intermediate server could also be private PC 9 of the user in his home 10, to which the information is transmitted, e.g., using an e-mail address communicated to central server 1 when the request is sent.

The information transmitted in step S2 from on-board computer 3 to central server 1 about the location of motor vehicle 2 may also be used by central server 1 to select—from the database of cartographic information, which could theoretically include the entire world, available in server 1—that portion which includes the location of the motor vehicle—generally speaking, a country, a part of a country, or the like—so that it may be subsequently sent to selected intermediate server 9.

The information transmitted in step S2 advantageously also includes information about the identity and/or a type of the on-board computer system, which is transmitted from on-board computer 3 without any action on the user's part, and which enables central server 1 to recognize which version—out of potentially a plurality of existing versions—of the program instructions of the navigation system is executable on on-board computer 3, to select it in step S3, and transmit it in step S4.

Since the transmission between central server 1 and intermediate server 9 takes place via wire-bound communications network 13, large quantities of information may be transmitted quickly and economically. Transmission of information from intermediate server 9 to on-board computer 3 (step S5) may take place with the aid of a line connection between the intermediate server and interface 6 of the on-board computer system. A line connection of this type may be part of a wire-bound, local network. It is also conceivable to transmit information within the framework of a wireless local network, such as a Bluetooth network. The wire-bound or network-supported method of transmitting information is utilized, in particular, when intermediate server 9 is the computer in repair shop 12, since, here, the distance between the computer and motor vehicle 2 may be made close enough that transmission via cable is practicable. When transmitting information to the user's private PC, it is likely that a portable data carrier such as a diskette or a CD-ROM will be used to transmit information further to on-board computer 3. The user then saves the data on the diskette or CD-ROM using his PC and subsequently inserts the diskette or CD-ROM into reading device 5 of on-board computer 3. When this method is used, a back-up copy of the information is created at the same time.

Once the permanent portion of the information required for the navigation system has been loaded in on-board computer 3 in this manner, on-board computer 3 performs the method steps described below, under the control of the program instructions contained in this information.

Every time the motor vehicle is started, in step S6, on-board computer 3 directs a request via the mobile wireless communications network to central server 1 (step S7) to deliver the temporary information required for proper operation of the navigation system. The request transmitted to the central server contains information about the identity of the on-board computer, e.g., a serial number of the on-board computer or the permanent portion of the information transmitted to it, which enables server 1 to check, in step S8, whether on-board computer 3 is authorized to obtain the temporary information. An authorization of this type could be denied when the temporary information is transmitted only within the framework of an agreement signed between the user of the motor vehicle and the operator of central server 1 that may have expired by the time the request is submitted, or if it is not possible for the operator of central server 1 for any other reason to charge the user with the costs for the transmission of the temporary information or its on-going compilation and storage. It is also conceivable that, if a plurality of versions of on-board computer 3 or permanent information loaded therein exists, the central server is able to select—within the framework of the authorization check in step S8—from a plurality of versions of temporary information, the version that is suited for the particular requesting on-board computer. If it is determined via the authorization check that the temporary information may be transmitted, this takes place in step S9. The temporary information may contain, e.g., information about construction sites or traffic jams in an area in which the motor vehicle is located, about special non-permanent events in this area, etc. It is also conceivable to transmit—within the framework of temporary information—geographical information of long-term relevance, e.g., regarding the geographical location of driving routes in a geographic zone in which the motor vehicle is currently located, if this zone is not the region in which the motor vehicle is typically located and, as a result, is not covered by the permanent information.

After the temporary information is transmitted, the information database required by the navigation system is complete, and the system is started up in step S10.

Steps S7-S9 may also be repeated regularly while the system is operating, so the latest temporary information about traffic jams, etc., is always available, or to download cartographic information, if needed, when the motor vehicle leaves the region included in the cartographic information in the navigation system.

The transmission system shown in FIG. 1 and the data processing device shown in FIG. 2 are also suited for use in other applications, e.g., within the framework of a telematics system, such as fleet management. This will be explained below with reference to the flow chart in FIG. 3.

This example is based on a company having a vehicle fleet that includes a large number of vehicles 2 equipped with data processing devices according to FIG. 2, and a large number of employees who work on different projects that may require them to use one of the motor vehicles, and a central server 1 that monitors the movements of motor vehicles 2 to allocate the costs to various projects. When an employee needs to use one of motor vehicles 2, this employee may utilize a workstation 9 and provide identification of the project to request, in step S2, the transmission of permanent information to be uploaded to a portable data carrier such as a diskette, a chip card, or the like. Central server 1 calculates (S3) and delivers (S4) this information, which contains identification of the project, to workstation 9, where the employee may transmit it to the data carrier (S5). With this data carrier in hand, the employee walks to any motor vehicle 2 and inserts the data carrier into the vehicle's reading device 5.

When the motor vehicle is started up (S6), on-board computer 3 sends, in step S7, a request to server 1, in which it transmits the project number and additional information relevant for calculating the driving costs, including the current mileage, in particular. In step S8, the central server checks whether the motor vehicle may be released. The release request could be denied, for example, if the stated project has been closed or its budget is exhausted (this situation may occur if a data carrier may be used repeatedly to release a motor vehicle for a longer period of time after it is created), or if the project is low-priority and the motor vehicle must be reserved for use for a higher-priority project. If it is determined via authorization check S8 that the motor vehicle may be used, a digital key is transmitted, in step S9, which prompts the on-board computer to remove, in step S10, an electronic immobilizer, so that the motor vehicle may be started up.

A further important application of the present invention is the implementation of a new application within the framework of an existing telematics system, which will be described below, also with reference to FIG. 3. On central server 1 of this system, an operator makes available a database required to utilize the new application, the database being subdivided into a permanent portion—a program code—and a temporary portion, which is composed of data that may change over time. The system has a number of users whose motor vehicles 2 are equipped with the devices required to utilize the services offered so far. The program code is designed in such a way that it may be executed by these devices.

The operator informs the user about the availability of the new service, e.g., by sending an e-mail to computers 9 of the individual users or via a message transmitted via wireless communication to the telematics devices in the individual motor vehicles 2. A short-message service (SMS) in a mobile wireless communications network such as GSM or UMTS can be utilized for this purpose, for example, which the telematics devices also use for data transmission within the framework of the telematics services already implemented. As an alternative, a message type may be provided as part of the messages exchanged between the devices and the central server within the framework of the already-implemented telematics services which enables the devices to query central server 1 about the availability of new services, or which enables central server 1 to communicate the availability of this service to the devices.

A user who has been notified via e-mail or a similar display on his telematics device about the availability of the new service may decide whether to use the service offered.

If the user decides to use the new service, two methods are possible, in particular, for communicating this decision to the central server and, as a result, to request transmission of the program code (step S2). One method is transmission via wireless communication from the telematics device to central server 1, as described above, in particular in the form of an SMS message or a message of a type provided for this purpose of the service that is already implemented. To this message, the telematics device automatically adds data related to its identity, such as a serial number, a model description, or other information about its technical equipment, which enables the central server to select, from a plurality of versions, the version of the program code of the new service that is suited for this device. An identification of an intermediate server to which the program code should be transmitted is also transmitted in the message. Advantageously, the user manually enters this identification in step S1 in advance; he can provide his own e-mail address, for example. The second method is transmission from the intermediate server, generally the user's personal computer 9, to central server 1. This method has the advantage that comprehensive information about the new service may be transmitted to the user, e.g., via the Internet, to enable the user to make a well-informed decision about whether to use the new service. In this case, the user generally enters the information on his computer 9, in step S1, which is required by central server 1 to select the correct program code version via the telematics device.

Based on the message received, central server 1 knows to which computer 9 to send the program code (step S3), and transmits it there (S4). Further transmission from computer 9 to the telematics device in motor vehicle 2 proceeds as described above.

Figure 4:
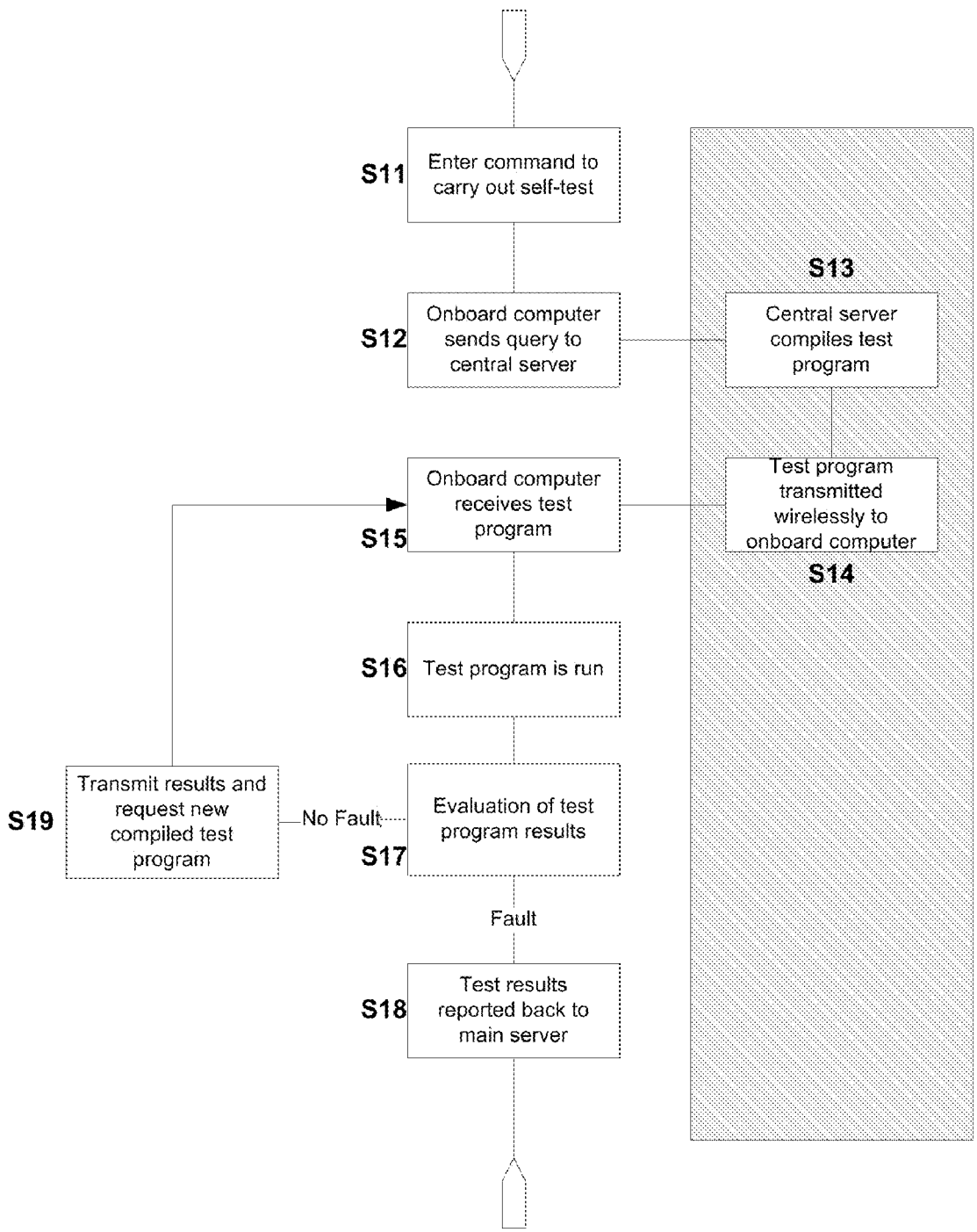

A further example of an application of the present invention is automatic functionality testing of a motor vehicle equipped with a data processing device according to FIG. 2. This functionality test is also made possible by providing on-board computer 3, which is connected to various sensors and actuators 7, with the appropriate software. Permanent information which the on-board computer requires to carry out a functionality test of this type, and which may be transmitted to on-board computer 3 as described above in steps S1 through S4, includes a set of software functions for querying the sensors and triggering the actuators, for transmitting test results to central server 1, and dialog functions that enable the user to also initiate a self-test via a human-machine interface 4, possibly by also specifying an assembly suspected of being faulty.

an example of the self-test procedure will be described with reference to the flow chart in FIG. 4. It is assumed that the permanent information required to carry out the self-test is already loaded in on-board computer 3. When the user enters the command to carry out a self-test, in step S11, on-board computer 3 sends a query to the central server, in step S12, which contains exact information about the vehicle model, among other information. Based on this information, the central server compiles, in step S13, a test program using the program components in the central server, also possibly using the information provided regarding the suspected cause of the fault. The test program is transmitted in step S14 via mobile wireless communications network 14 to on-board computer 3. Since the hardwired functions for addressing the sensors and actuators 7 are already provided in on-board computer 3, they do not have to be transmitted via wireless communication from central server 1. This reduces the quantity of data to be transmitted and makes it easier to compile the test program to be transmitted, since technical details of the various models of sensors and actuators that may be installed in various vehicles need not be taken into account when the test program is compiled.

The test program received in step S15 is run by on-board computer 3 in step S16. If the evaluation of its results in step S17 results in the unequivocal detection of a fault cause, the result may be reported back to the main server immediately, in step S18. The result may also be displayed simultaneously to the user on a display of human-machine interface 4. Based on the results and on the information transmitted in the query in step S12 about the location of the motor vehicle, central server 1 is now able to identify a repair shop near the motor vehicle and query the repair shop as to whether it has the part required to repair the motor vehicle.

If the part is not available, the central server may check with other repair shops until one is found that has the required part, or it may cause the part to be transferred from one of the repair shops. Information about the repair shop that was identified is advantageously transmitted to on-board computer 3, so it can display it, together with the test result, in the form of a recommendation for eliminating the fault.

If the evaluation of the result, in step S17, does not result in an unequivocal identification of the fault cause, a new wireless communication link to central server 1 is established, in step S19, to transmit the results and, based on these results, to request a new compiled test program from the central server. The process then returns to step S15.

Instead of evaluating test results delivered by the sensors in on-board computer 3, it is also possible to transmit them via mobile wireless communications network 14 to the central server, enabling it to carry out the evaluation. Although the quantity of data to be transmitted via wireless communication is generally greater than when the evaluation is carried out locally in on-board computer 3, it may still be economical if the evaluation requires a great deal of computing power and exceeds the capacities of on-board computer 3, or if the transmission of all evaluation routines to the on-board computer in step S14 requires a great deal of time.

What is claimed is:

1. A method for starting up an application in a mobile data processing device, an information database being required in a device for operating the application, comprising:
   a) providing a permanent portion and a temporary portion of the information database;
   b) receiving a request input by a user of the device to transmit the permanent portion;
   c) identifying an intermediate server located in the vicinity of the device;
   d) performing wire-bound transmission of the permanent portion from a central server to the intermediate server;
   e) transmitting the permanent portion from the intermediate server to the device for operating the application via a portable data carrier and storing the permanent portion in the device for operating the application;

f) checking the central server to ascertain if the device is authorized to access the temporary portion;

g) transmitting the temporary portion via wireless communication, the wireless communication representing a second transmission path that is distinct from the first transmission path; and h) executing the application.

2. The method as recited in claim 1, wherein step d) is triggered by a transmission of a request from one of the intermediate server and the device for operating the application to the central server.

3. The method as recited in claim 2, wherein the transmission in step d) takes place via a dial-up connection.

4. The method as recited in claim 2, further comprising:
before step d) is carried out, transmitting data containing information about one of an identity of the mobile device and a location of the mobile device from the device for operating the application to the central server.

5. The method as recited in claim 4, wherein, based on transmitted data about the identity of the mobile device, one version is selected for transmission out of a plurality of versions of the temporary portion made available on the central server.

6. The method as recited in claim 1, further comprising:
before step g), transmitting information specific to the mobile device via wireless communication from the mobile device to the central server, wherein step g) is carried out only if the central server recognizes, based on the specific information, that the mobile device is suited to receiving the temporary portion.

7. The method as recited in claim 6, wherein the transmission of the specific information takes place in such a way that it is controlled by the permanent portion of the information database.

8. The method as recited in claim 1, further comprising:
calculating the temporary portion by the central server based on data transmitted previously from the device for operating the application via wireless communication.

9. The method as recited in claim 1, wherein the application is a testing program for testing a functionality and diagnosing malfunctions of one of the mobile device and another device connected thereto.

10. The method as recited in claim 1, wherein the mobile device is part of an electronic system of a motor vehicle.

11. The method as recited in claim 10, wherein steps f)-h) are continuously repeated while the motor vehicle is operating.

12. The method as recited in claim 1, wherein the temporary portion includes geographic information.

13. The method as recited in claim 12, wherein the geographic information includes geographic information that has only temporary validity.

14. The method as recited in claim 1, further comprising:
updating the temporary portion from time to time while the device for operating the application is operating.

15. A data transmission system used to start up an application in a mobile data processing device, the system comprising:

a plurality of intermediate servers;

a central server storing a permanent and a temporary portion of the information database;

a wire-bound communications network connecting the central server to the plurality of intermediate servers, the central server identifying a nearest one of the intermediate servers and transmitting the permanent portion to the nearest intermediate server after a user input request and via the wire-bound communications network, the intermediate servers transmitting the permanent portion to a portable data carrier via which the permanent portion is transferred to the mobile data processing device;

a cellular mobile wireless communication system having an output connecting to the central server, the cellular mobile wireless communication system transmitting the temporary portion after the central server is checked for authorization;

an on-board computer for receiving instructions to operate the system, the on-board computer having a data transmission interface to enable a connection with the central server;

a plurality of sensors for detecting a plurality of operating parameters in a motor vehicle, the plurality of sensors being connected to the on-board computer through a bus; and a human-machine interface device for displaying a plurality of functionalities of the data transmission system, the human-machine interface device having an input and an output arrangement, wherein the output arrangement displays the plurality of operating parameters detected by the sensors.

16. The system as recited in claim 15, wherein the plurality of intermediate servers are computers.

17. The system as recited in claim 15, wherein the cellular mobile wireless communication system is a GSM or a UMTS network that includes a plurality of geographically distributed base stations.

18. The system as recited in claim 15, wherein the permanent portion of the central server contains program instructions sent to the on-board computer.

19. A method for starting up an application in a mobile data processing device, an information database being required in the device for operating the application, the method comprising:

providing a permanent portion and a temporary portion of the information database;

performing wire-bound transmission of the permanent portion from a central server to an intermediate server;

transmitting the permanent portion from the intermediate server to the device via a portable data carrier;

storing the permanent portion in the device;

transmitting the temporary portion via a radio path; and executing the application.

* * * * *